May 15, 1945.    B. R. McBATH    2,376,068
FEED WATER HEATER
Filed June 11, 1942    7 Sheets-Sheet 7

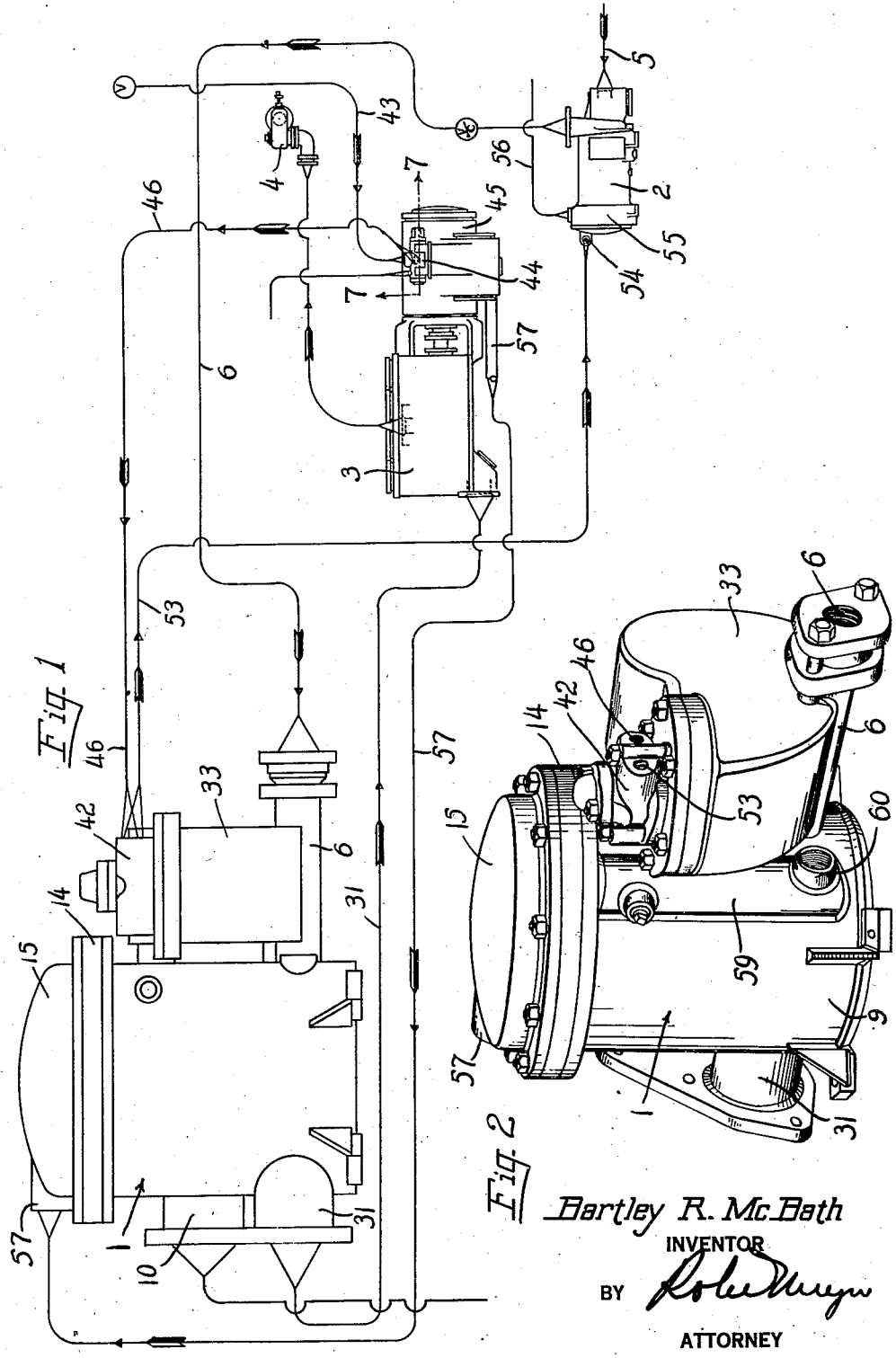

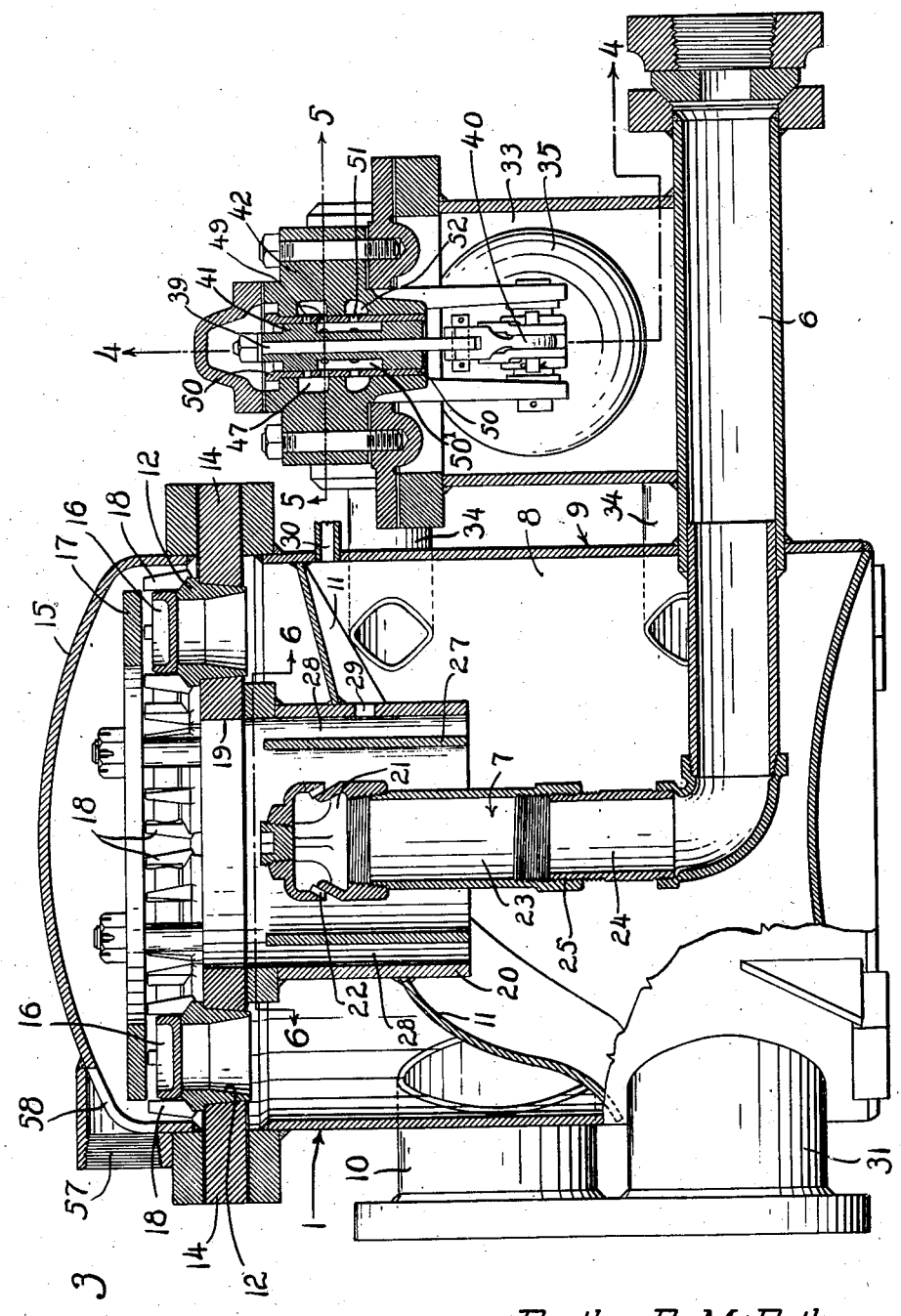

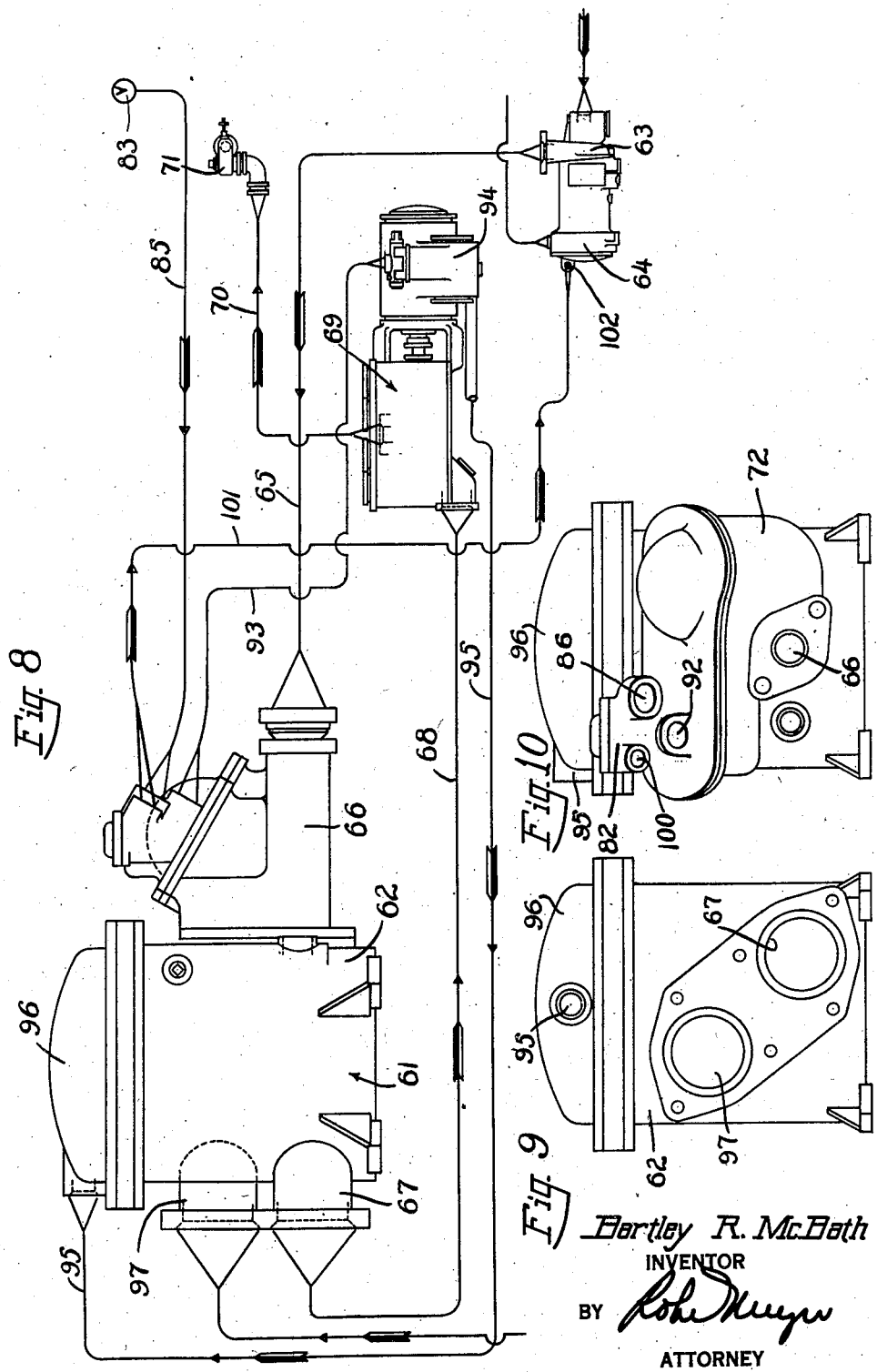

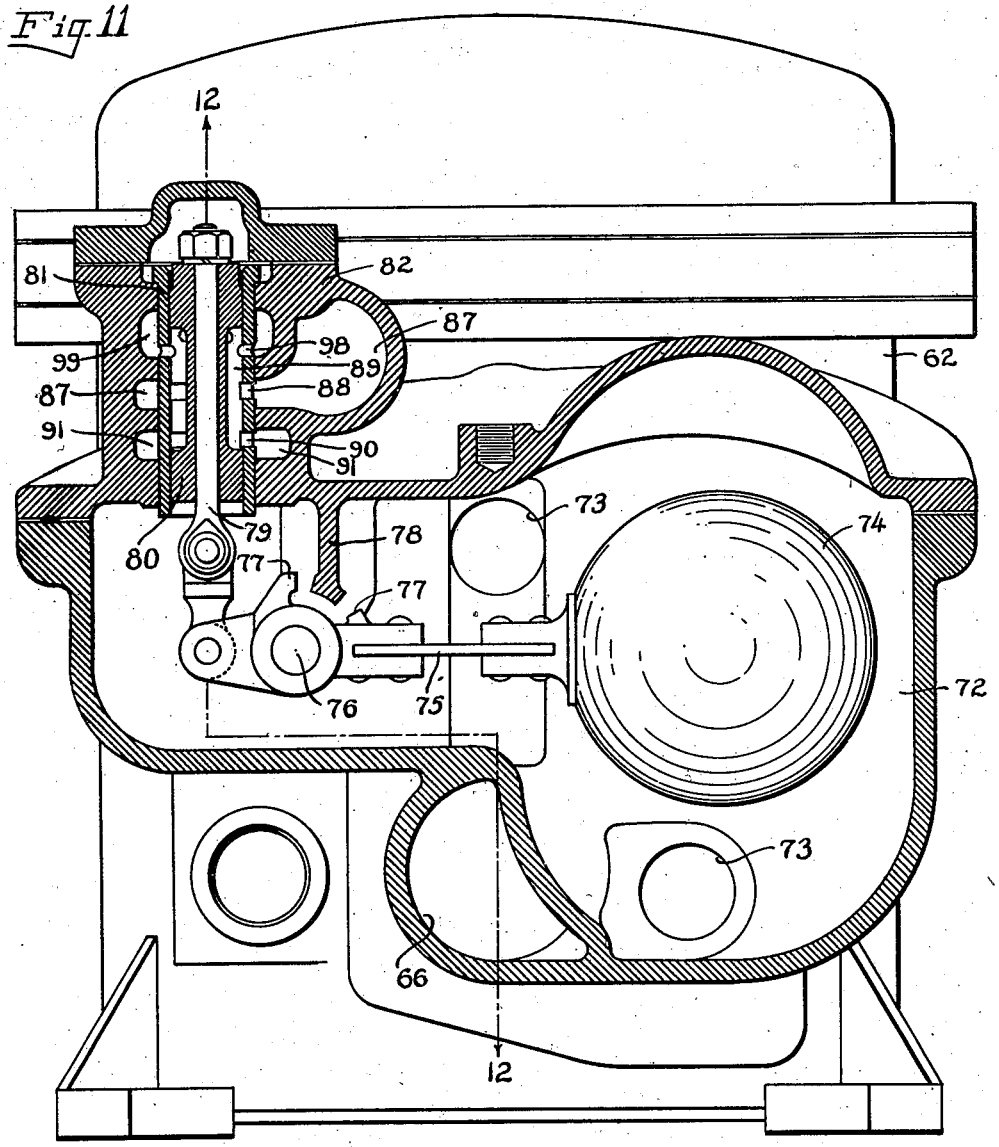

Bartley R. McBath
INVENTOR
BY
ATTORNEY

Patented May 15, 1945

2,376,068

UNITED STATES PATENT OFFICE 2,376,068

FEED WATER HEATER

Bartley R. McBath, Glen Ridge, N. J., assignor to Worthington Pump and Machinery Corporation, Harrison, N. J., a corporation of Delaware Application June 11, 1942, Serial No. 446,574

25 Claims. (Cl. 261—10)

This invention relates to feed water heaters for locomotives, and more particularly to locomotive feed water heaters of the type commercially known as open or contact heaters, wherein the exhaust steam from the locomotive cylinders is brought into direct contact with the boiler feed water for heating the water and condensing the steam, and the commingled heated water and condensate are fed to the boiler of the locomotive.

An object of the present invention is to provide a compact light weight construction for feed water heater, which will materially reduce the weight thereof over approved types of locomotive feed water heaters now on the market, and which will utilize the maximum heat transfer from the steam to the water.

Another object of the invention is the provision of novel means and novel arrangement thereof for delivering and spraying the cold water to be heated into the steam space of the heater, said means being constructed and arranged so that by variation of the distance between the heated water in the heater and the point of entrance of cold water into the steam space regulation of the time interval and travel distance of contact of the steam and water for controlling the temperature of the heated water is provided.

A further object of the invention is to provide float actuated means for controlling the delivery of cold water to the heater and/or control both the delivery of cold water to the heater and the withdrawal of hot water from the heater, said float actuated means being located in a float chamber arranged in relation to the heating space in the heater and provided with suitable means for cooling it so as to prevent the flashing of the water in the float chamber to vapor and the consequent interference with the effective and efficient operation of the float and the means operated thereby.

Another object of the present invention is the provision of a feed water heater of the open or direct contact type wherein the steam flows into the heater in an annular band and is diverted and its flow direction reversed to cause it to flow toward the axis of the annular entrance flow and inwardly into the contact or heating space of the heater, thereby preventing any cross flow of any part of the incoming steam with the resultant interference.

With these and other objects in view, as may appear from the accompanying specification, the invention consists of various features of construction and combination of parts, which will be first described in connection with the accompanying drawings, showing a feed water heater of the preferred form embodying the invention, and the features forming the invention will be specifically pointed out in the claims.

In the drawings:

Figure 1 is a digrammatic view of the improved locomotive feed water heater system.

Figure 2 is a perspective view of the heater proper.

Figure 3 is a vertical longitudinal section through the heater.

Figure 8 is a diagrammatic view of a modified form of the improved locomotive feed water heater.

Figure 9 is a side elevation of the modified form of the heater.

Figure 10 is an end view of the modified form of the heater.

Figure 11 is a vertical cross-section through the modified form of the heater.

Figure 4:
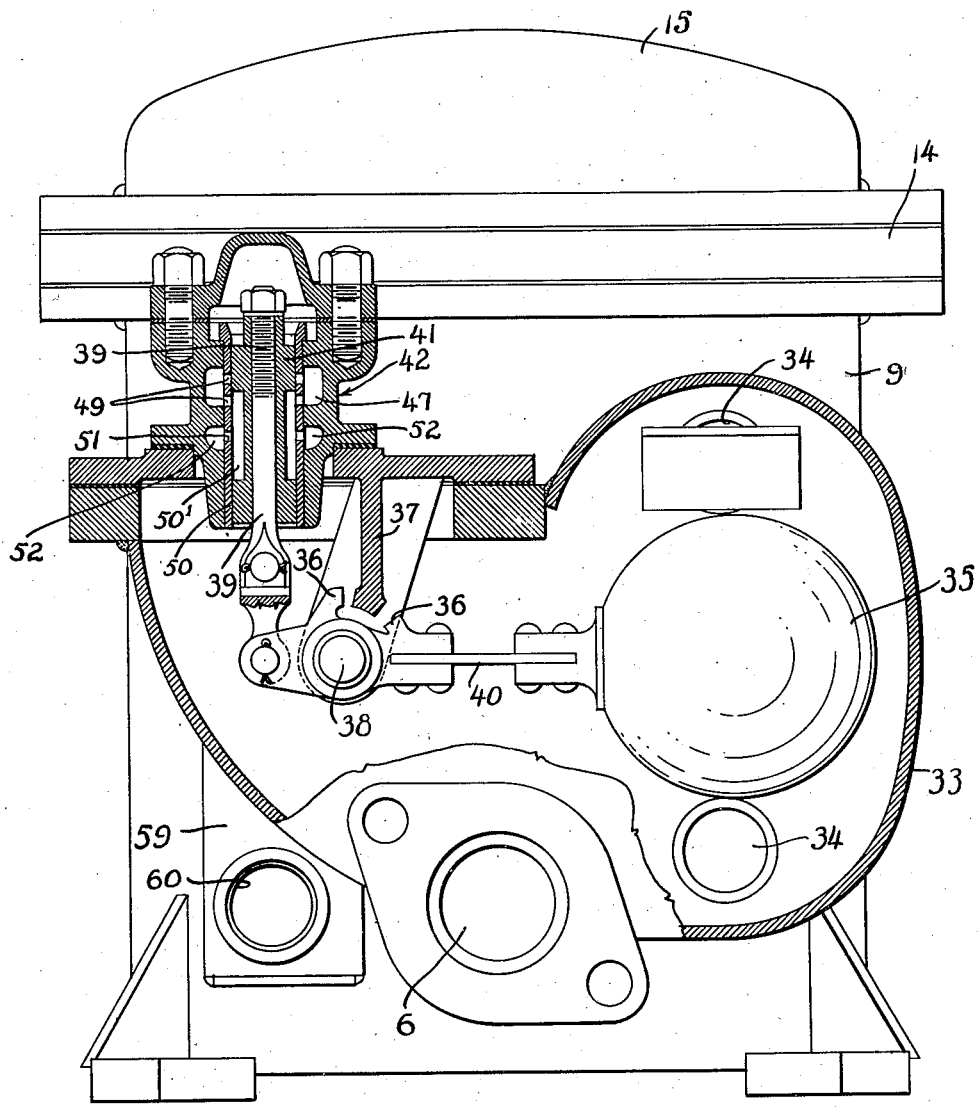
Figure 4 is a vertical cross-section through the heater taken on the line 4—4 of Figure 3.
Figure 5:
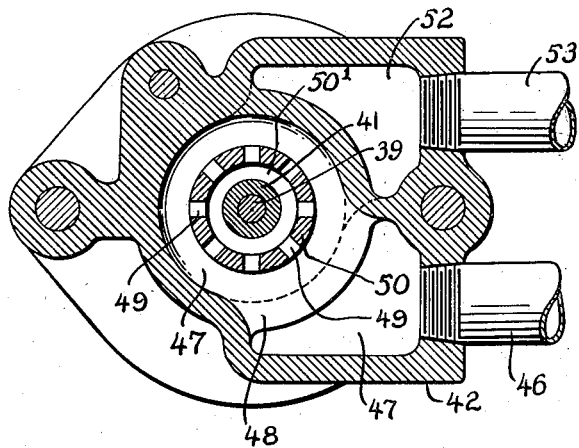
Figure 5 is a detailed horizontal section taken on the line 5—5 of Figure 3.
Figure 6:
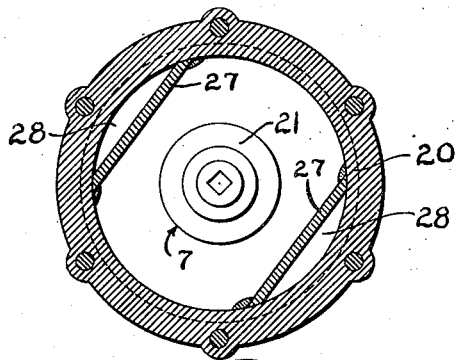
Figure 6 is a horizontal cross-section taken on the line 6—6 of Figure 3.
Figure 7:
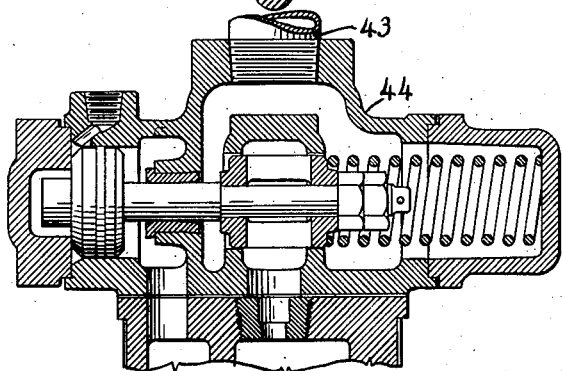
Figure 7 is a detailed section through a steam distributing valve employed in the feed water heater system.

Referring more particularly to the drawings, Figure 1 shows the entire locomotive feed water heater system, which includes the open or contact type of feed water heater 1, to which cold water to be heated is delivered from a locomotive tender (not shown) by the cold water pump 2, while the heated water is taken from the feed water heater 1 by the hot water pump 3 and delivered thereto through the boiler check valve 4 to the locomotive boiler (not shown).

The cold water pump 2 receives the cold water from the locomotive tender (not shown) through its inlet 5, and discharges the water through the suitable piping 6 and the spray mechanism 7 into the heating or contact space 8 within the body 9 of the heater 1.

The heating steam, which is the exhaust steam from a locomotive (not shown), enters the body 9 through the steam inlet 10, and it is deflected upwardly by the partition 11, so that the incoming steam will pass upwardly through the various valve seats 12 carried by the valve deck 14 into the interior of the top or dome 15 of the body 9.

Check valves 16 cooperate with the valve seats 12 and are limited in their movement by a stop plate 17, while they are guided in their movement by suitable guides 18 formed on the valve seats 12. The steam check valve structures constituting the seats 12 and valves 16 are arranged in a circle concentrically of the axis of the chamber 8, and the top 15 of the body 9 is curved so as to direct the steam flowing through the check valves inwardly toward the axis of the body and downwardly through the central opening 19 formed in the valve deck 14. A steam guiding skirt 20 is carried by the partition 11 and has its bore aligning with the opening 19. The skirt 20 projects through the partition 11 and opens out at its lower end into the contact space 8 within the body 9. The nozzle structure 7, through which the cold water enters the heater, is disposed with its axis in alignment with the axis of the skirt 20. The nozzle 7 has a spray head 21 detachably connected with its upper end, which spray head has its upper end closed and its sides provided with a plurality of annularly spaced downwardly and outwardly inclining spray openings 22, which spray the cold water downwardly into the interior of the skirt 20 substantially in the same direction as the flow of steam through the skirt but at an acute angle to the direct flow path of the steam, so as to cause an intimate mixing contact of the steam and water to provide both condensation of the steam and heating of the water. The inner surface of the skirt 20 serves to break up and scatter the minute streams of water sprayed from the spray head 21 to further increase the heating contact of the steam and water.

The nozzle structure 7 is shown in the drawings as made of two sections, 23 and 24, which are adjustably connected in any suitable manner, such as by threads at 25. Thus the height of the nozzle 7 may be varied, or, in other words, the distance which the nozzle projects into the skirt 20 may be varied, thus varying the distance between the point of ejection of the sprays of water from the spray head 21 and the heated water level in the heater 9. The variation of this distance provides variation in both the time interval and the contacting flow distance of the contact of the steam and water in the skirt 21, and consequently permits variation of the temperature to which the cold water is heated, with a constant steam inlet condition. Thus, if it is found that the cold water is being heated to too high a temperature the length of the nozzle 7 is adjusted to move the spray head 21 downwardly or inwardly in the skirt 20, so as to shorten the time interval and distance of the contact of the steam and water, whereas if it is found that the water is not being heated to the desired high temperature the length of the nozzle 7 may be adjusted to increase both the time interval and length of the contact flow of the steam and water in the confined passage formed by the skirt 20.

For the purpose of preventing excessive turbulence in the space 8 and maintaining therein the desired pressure substantially the pressure of the entering exhaust steam, so as to prevent flashing of the heated water, means are provided to permit a limited amount of steam to flow directly into the space 8 without contacting water in the confined passage within the skirt 20. In the form shown in the drawings, this means constitutes one or more flat plates 27, which extend across portions of the interior of the skirt 20, providing the passage or passages 28, which have their entrance near the opening 19 in the valve deck 14 and their exit into the space 8. While the space 8 has heretofore been referred to as a contact space of the heater, in reality the actual heating contact space of the heater is the confined space within the skirt 20, and any space in the lower portion of the body 9 above the level of the heated water therein does provide for contact of the water passing from the interior of the skirt 20 and the steam which flows thereinto through the passage or passages 28. A relief opening 29 is provided in the skirt 20, so that equalization of steam pressure between passages 28 and the area within the body 9 above the level of heated water therein will be maintained. A vent 30 is provided to permit noncondensed steam and released non-condensable gases to escape from the interior of the body 9.

While in Figure 3 of the drawings the nozzle 7 is shown as being constructed of two adjustably connected sections for adjusting it to vary the distance which it projects into the skirt 20, it is to be understood that the connection of the spray head 21 to the body of the nozzle may be such as to permit adjustment of their connection to vary the position of the spray head 21 within the skirt to regulate the heating of the water.

The heated water and the condensed steam fall into the bottom of the body 9, and it is withdrawn therefrom through the hot water outlet 31 by the hot pump 3 for delivery to the boiler check valve 4. Means are provided for controlling the quantity of water heated by the feed water heater by control of the delivery of cold water to the heater.

The delivery of cold water to be heated to the heater is controlled by the level of heated water in the heater, and to provide such control suitable mechanism is provided, including the float chamber 33. The float chamber 33 is placed outside of and spaced from the body 9, as clearly shown in Figures 1 and 3 of the drawings, for the purpose of allowing free circulation of air about the float chamber to cool the float chamber and prevent heated water therein from flashing into steam. The float chamber 33 has connection with the interior of the body 9 through suitable conduits 34, so that the level of water in the float chamber 33 will vary with variation of the level of heated water in the body 9.

Besides spacing the float chamber 33 from the body 9 so as to permit circulation of air thereabout, the supply pipe 6 which delivers the cold water to the feed water heater extends along and contacts the float chamber to assist in cooling the chamber and the water therein.

A float 35 is pivotally mounted in the float chamber 33, and suitable stops 36 are provided which coact with a stop 37 to limit the swinging movement of the float. The float 35 is pivotally supported at 38, and a valve stem 39 is connected to the float-carrying arm 40 on the opposite side of its pivot 38 from the float 35.

A valve piston 41 is adjustably connected to the valve stem 39, and reciprocates within a valve housing 42 during pivotal movement of the float-carrying arm 40.

Steam for operating the cold water pump 2 is taken from a steam supply source on the locomotive (not shown) and passes through suitable piping 43 into and through the distributor valve structure 44, which distributor valve structure controls the distribution of the steam to the operating steam end 45 of the hot water pump 3, and also directs or distributes part of the steam through suitable piping 46 into the chamber 47 in the valve housing 42. The steam passes from the chamber or space 47 through a suitable port 48 and through ports 49 in the distributing sleeve 50. When the valve piston 41 is in the position shown in Figure 4 of the drawings, the steam flows from the ports 49 through the space 50¹ provided by the reduced portion of the valve piston 41, and out through the ports 51 in the sleeve 50 into the space or chamber 52 formed in the valve housing 42. From the chamber 52 the steam flows through suitable piping 53 to the steam inlet 54 of the steam end 55 of the cold pump 2. The steam from the steam end 55 of the cold pump 2 may exhaust to atmosphere or any desired point through the exhaust pipe 56. When the level of water in the body 9 rises, it will raise the float 35, moving the valve stem 39 and valve piston 41 inwardly for cutting off or closing the ports 49, and consequently cutting off the supply of steam to the cold pump 2. By the provision of a plurality of ports 49, arranged in longitudinal spaced relation in the sleeve 50, the quantity of steam delivered to the steam end of the cold pump 2 may be varied or regulated for regulating the speed of operation of the cold pump 2, and consequently regulating the quantity of cold water delivered to the said water heater in proportion to the quantity of heated water in the body 9. Since the quantity or level of heated water in the body 9 is directly controlled by the quantity of heated water withdrawn from the body 9 by the hot pump 3 in accordance with the demand for water of the locomotive boiler, the quantity of cold water delivered to the heater will therefore be controlled by the demand for water by the boiler of a locomotive equipped with the feed water heater system.

As the level of water in the body 9 falls, the float 35 will also fall or move downwardly and move the valve piston 41 upwardly to increase the quantity of steam delivered to the cold pump in proportion to the lowering of the level of water in the body 9.

The exhaust steam from the steam end 45 of the hot water pump 3 passes through suitable piping 57 and into the dome 15 of the body 9 through the port 58, from hence it passes with the exhaust steam downwardly through the opening 19 and the skirt 20.

In Figures 2 and 4 of the drawings, the vent opening 30 is shown as opening into a passageway formed by the plate 59, which is welded or otherwise attached to the outside of the body 9 of the feed water heater 1, and an outlet or vent connection 60 is provided at the bottom of the passage formed by the plate 59.

Figures 8 to 12, inclusive, illustrate a modified form of the feed water heater construction. The main difference between the feed water heater of the modified construction and that of the structure shown in Figures 1 to 7 resides in the control mechanism, namely, in that in the structure shown in Figures 1 to 7 of the drawings and heretofore described, control of cold water supplied to the heater is by the level of heated water in the heater and no control of the hot pump by the level of the water in the heater is provided, while in the structure shown in Figures 8 to 12, inclusive, of the drawings, means are provided for controlling both the hot and cold pumps by the level of water in the heater body.

In the modified construction of the heater, the heater proper 61 constituting the body 62 is just the same as that shown and described in Figures 1 to 7 of the drawings, embodying in its interior construction all of the features shown in Figures 3 and 4 of the drawings, that is, the arrangement of the check valves for the incoming steam, the cold water injection nozzle, the contact space, the confining skirt, etc. The cold water is taken from a locomotive tender (not shown) by the cold water pump 63, which is operated by a steam end 64 of approved construction and is delivered through the piping 65 and inlet water connection 66 into the heater body 62, while the hot or heated water is taken from the body 62 through the hot water outlet 67 through piping 68 to the intake of the hot water pump 69. The hot water is discharged by the hot pump 69 through suitable piping 70 to the boiler check valve 71.

The body 62 of the feed water heater proper has a float chamber 72 associated therewith and connected thereto by suitable openings 73, so that the water level in the float chamber 72 will vary with variation of the water level in the body 62. The float chamber 72 is placed exteriorly of the heater body 62, so as to allow free circulation of air thereabout, and the cold water connection 66 is formed upon the float chamber, so that the circulation of air about the float chamber and the passage of cold water through the connection 66 will cool the float chamber and prevent heated water therein from flashing into vapor.

A float 74 is positioned in the float chamber 72 and is carried by a pivotal float arm 75 pivotally supported at 76. Movement of the float 74 is limited by stops 77 carried by the float arm 75, and a stop 78 carried by the cover of the float chamber 72.

A valve stem 79 is connected to the end of the float arm 75 opposed to the end which carries the float 74, so that as the float moves downwardly the valve stem 79 will move upwardly, and when the float moves upwardly the valve stem 79 will move downwardly. A valve piston 80 is adjustably carried by the valve stem 79 and reciprocates, upon movement of the valve stem in the distributing sleeve 81 carried by the valve housing 82.

Steam for operating both the cold pump 63 and the hot pump 69 passes from any suitable steam supply source (not shown) on the locomotive, which steam supply is controlled initially by a throttle valve indicated at 83.

The steam passes from valve 83 through the pipe 85, opening 86 (see Fig. 10), into the steam inlet space 87 (see Fig. 12) in the valve housing 82. From the steam inlet space 87 the steam passes through a suitable port or ports 88 in the valve sleeve 81 into the space 89 surrounding the reduced portion of the valve piston 80.

Figure 12:
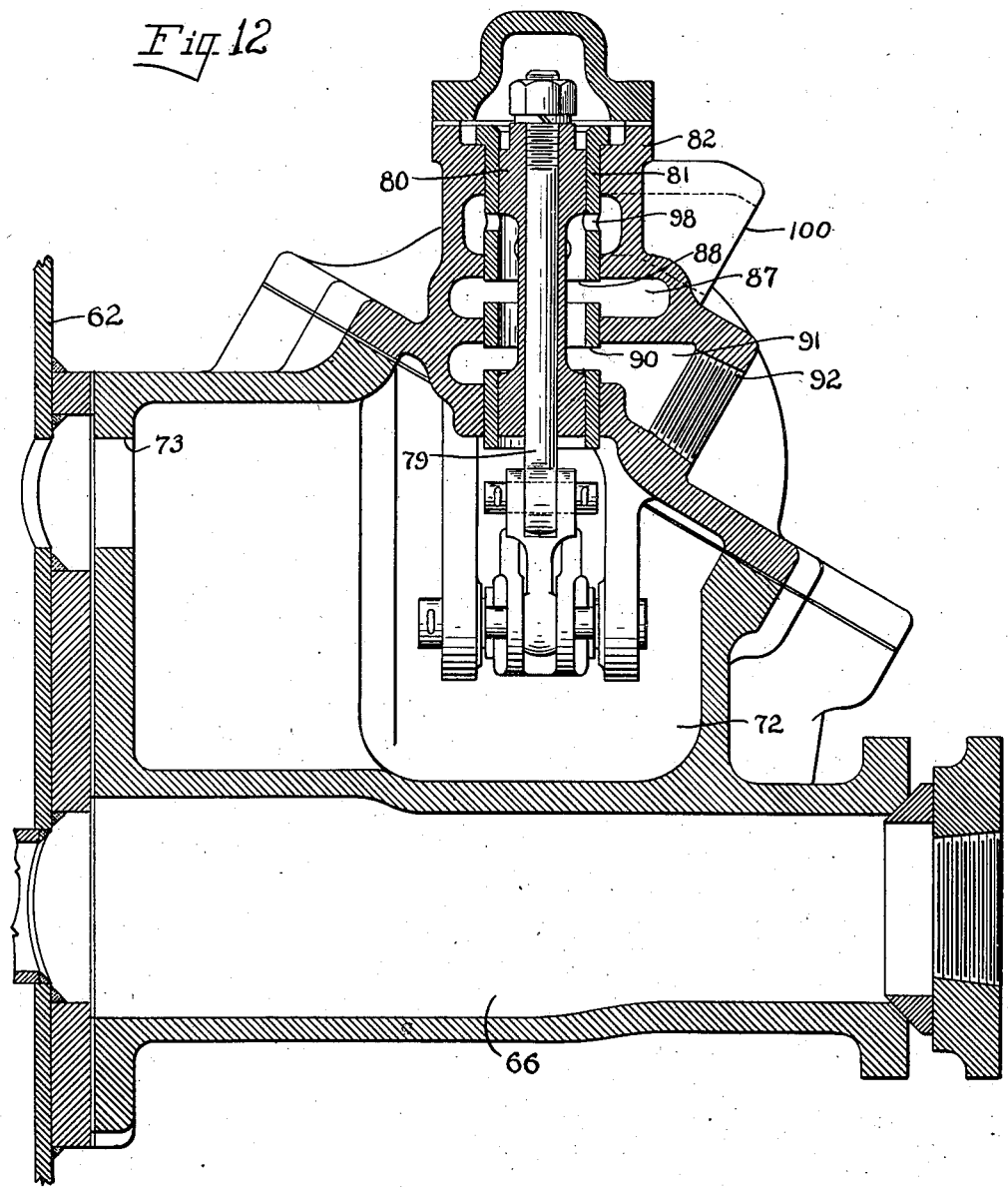
Figure 12 is a detailed vertical section through the modified form of the heater taken on the line 12—12 of Figure 11.

When the float is in its midway position, as shown in Figures 11 and 12 of the drawings, steam passes in both directions through the space 89, some of the steam passing outwardly through the port or ports 90 in the sleeve 81 and into the space 91 in the valve housing 82, from which it passes outwardly through the port 92 and suitable piping 93 to the inlet of the steam end 94 of the hot pump 69. The exhaust steam from the steam end 94 of the hot pump 69 passes through suitable piping 95 into the dome 96 of the body 62 of the feed water heater, where it mingles with the exhaust steam which enters the body 62 through the steam inlet 97.

The steam which passes upwardly through the space 89 passes through suitable ports 98, into the space 99 in the valve housing 82, outwardly through the opening 100 and through suitable piping 101 to the steam inlet 102 of the steam end 64 of the cold pump 63, and thus the variation of the level of water in the body 62 of the feed water heater controls the delivery of steam to both the cold pump 63 and the hot pump 69, thus providing control of the delivery of cold water to the feed water heater and withdrawal of heated water from the feed water heater.

By particular reference to the drawings, it will be noted that the feed water heaters of the present invention are constructed and designed so that they may be built up of sheet metal and welded in lieu of being cast, thus permitting the provision of a strong practical feed water heater which is much lighter in weight than feed water heaters of approved type in which the body sheets are cast.

It will be understood that the invention is not to be limited to the specific construction or arrangement of parts shown, but that they may be widely modified within the invention defined by the claims.

What is claimed is:

1. In a feed water heater, a body containing a contact space for steam and water, means for delivering cold water to be heated to said space, means for delivering steam to said space, a float chamber exteriorly of said body and connected thereto to receive heated water from the body, and means actuated by the level of water in said float chamber for controlling the flow of cold water to said contact space, said cold water supply means including a conduit, said conduit contacting said float chamber to cool the chamber to prevent heated water therein from flashing into vapor.

2. In a feed water heater, a body containing a contact space for steam and water, means for delivering cold water to be heated to said space, means for delivering steam to said space, a float chamber exteriorly of said body and connected thereto to receive heated water from the body, and means actuated by the level of water in said float chamber for controlling the flow of cold water to said contact space, said float chamber being provided with relatively thin walls and being spaced from said body to permit circulation of air about the chamber for cooling it, said cold water supply means including a conduit, said conduit contacting said float chamber to cool the float chamber in cooperation with the circulation of air about the chamber to prevent heated water in the chamber from flashing into vapor.

3. In a feed water heater, a body containing a contact space for steam and water, said body having an inlet for steam into said space, a sprayer for spraying water to be heated into said contact space, and means for permitting adjustment of the position of said sprayer relative to said steam inlet to vary the time interval and flow distance of contact of the steam and water in the contact space for regulating the degree of heating of the water.

4. In a feed water heater, a body containing a confined contact space for steam and water, a valve deck carried by said body and provided with a central opening which opens into said confined contact space, a plurality of steam inlet valves carried by said deck about said opening, and a guiding dome on said body for directing steam from said valves through said opening into said contact space, said valves arranged whereby steam passing to said opening will not flow across any of the valves.

5. In a feed water heater, a body containing a confined contact space for steam and water, a valve deck carried by said body and provided with a central opening which opens into said confined contact space, a plurality of steam inlet valves carried by said deck about said opening, a guiding dome on said body for directing steam from said valves through said opening into said contact space, said valves arranged whereby steam passing to said opening will not flow across any of the valves, a sprayer for spraying water to be heated into said confined contact space, and means for permitting adjustment of the position of said sprayer relative to said steam inlet opening to vary the time interval and flow distance of contact of the steam and water in said contact space for regulating the degree of heating of the water.

6. In a feed water heater, a body containing a confined contact space for steam and water, a valve deck carried by said body and provided with a central opening which opens into said confined contact space, a plurality of steam inlet valves carried by said deck about said opening, a guiding dome on said body for directing steam from said valves through said opening into said contact space, said valves arranged whereby steam passing to said opening will not flow across any of the valves, a sprayer for spraying water to be heated into said contact space and having its axis in alignment with the axis of the central opening in said valve deck, said contact space being formed by a cylindrical skirt carried by and depending from said valve deck providing a cylindrical wall about the contact space against which the streams of water from said sprayer are broken up, and means permitting adjustment of the position of said sprayer relative to the central opening in said valve deck to vary the time interval and flow distance of contact of the steam and water for regulating the degree of heating of the water.

7. In a feedwater heater, a body having a hot water collection space therein and an inlet for steam to the body, means forming a confined steam and water contact space in said body and arranged so that steam passes through the contact space from the steam inlet to said water collection space, means for spraying water to be heated into said confined contact space inwardly of the steam inlet thereto and in the general direction of but at an acute angle to the direction of steam flow through the contact space, and means for controlling the rise in temperature of the water being heated irrespective of the quantity of steam entering the confined contact space consisting of a fixed by-pass formed in said contact space forming means and having its inlet position outwardly of the point of entrance of water into the contact space and its outlet opening into said water collection space.

8. In a feedwater heater, a body having a hot water collection space therein and an inlet for steam to the body, means forming a confined steam and water contact space in said body and arranged so that steam passes through the contact space from the steam inlet to said water collection space, means for spraying water to be heated into said confined contact space inwardly of the steam inlet thereto and in the general direction of but at an acute angle to the direction of steam flow through the contact space, and means for controlling the rise in temperature of the water being heated irrespective of the quantity of steam entering the confined contact space consisting of a fixed by-pass formed in said contact space forming means and having its inlet position outwardly of the point of entrance of water into the contact space and its outlet opening into said water collection space, said body provided with a vent to permit escape of steam and released gases from said hot water collection space.

9. In a feedwater heater, a body having a hot water collection space therein and an inlet for steam to the body, means forming a confined steam and water contact space in said body and arranged so that steam passes through the contact space from the steam inlet to said water collection space, means for spraying water to be heated into said confined contact space inwardly of the steam inlet thereto and in the general direction of but at an acute angle to the direction of steam flow through the contact space, and means for controlling the rise in temperature of the water being heated irrespective of the quantity of steam entering the confined contact space consisting of a fixed bypass formed in said contact space forming means and having its inlet position outwardly of the point of entrance of water into the contact space and its outlet opening into said water collection space, said body provided with a vent to permit escape of steam and released gases from said hot water collection space said contact space forming means provided with a safety vent inwardly of the outlet of the contact space to permit passage of steam from the contact space in the event its outlet is closed by water in the hot water collection space.

10. In a feedwater heater, a body having a hot water collection space therein and an inlet for steam to the body, means forming a confined steam and water contact space in said body and arranged so that steam passes through the contact space from the steam inlet to said water collection space, means for spraying water to be heated into said confined contact space inwardly of the steam inlet thereto and in the general direction of but at an acute angle to the direction of steam flow through the contact space, and means for controlling the rise in temperature of the water being heated irrespective of the quantity of steam entering the confined contact space consisting of a fixed bypass formed in said contact space forming means and having its inlet position outwardly of the point of entrance of water into the contact space and its outlet opening into said water collection space, said body provided with a vent to permit escape of steam and released gases from said hot water collection space, said water spraying means being adjustable to regulate the time interval of contact of steam and water in the confined contact space to regulate the degree of temperature rise in the water being heated.

11. In a feedwater heater, a body having a hot water collection space therein and an inlet for steam to the body, means forming a confined steam and water contact space in said body and arranged so that steam passes through the contact space from the steam inlet to said water collection space, means for spraying water to be heated into said confined contact space inwardly of the steam inlet thereto and in the general direction of but at an acute angle to the direction of steam flow through the contact space, and means for controlling the rise in temperature of the water being heated irrespective of the quantity of steam entering the confined contact space consisting of a fixed bypass formed in said contact space forming means and having its inlet position outwardly of the point of entrance of water into the contact space and its outlet opening into said water collection space, said body provided with a vent to permit escape of steam and released gases from said hot water collection space, said contact space forming means provided with a safety vent inwardly of the outlet of the contact space to permit passage of steam from the contact space in the event its outlet is closed by water in the hot water collection space, said water spraying means being adjustable to regulate the time interval of contact of steam and water in the confined contact space to regulate the degree of temperature rise in the water being heated.

12. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surfaces for the transmission of heat is limited resulting in a substantially uniform degree of temperature rise in the water being heated regardless of the quantity of steam delivered to the confined contact space.

13. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surface for the transmission of heat is limited resulting in a substantially uniform degree of temperature rise in the water being heated regardless of the quantity of steam delivered to the confined contact space, said water spraying means being adjustable to regulate the time interval of contact of steam and water in the confined contact space to control the degree of temperature rise in the water being heated.

14. In a feedwater heater, a body having a hot water collection space therein and an inlet for steam to the body, means forming a confined steam and water contact space in said body and arranged so that steam passes through the contact space from the steam inlet to said water collection space, means for spraying water to be heated into said confined contact space inwardly of the steam inlet thereto and in the general direction of but at an acute angle to the direction of steam flow through the contact space, and means for controlling the rise in temperature of the water being heated irrespective of the quantity of steam entering the confined contact space consisting of a fixed bypass formed in said contact space forming means and having its inlet position outwardly of the point of entrance of water into the contact space and its outlet opening into said water collection space, a float chamber having communication with said hot water collecting space to receive water therefrom, a float in said chamber, and means actuated by said float for controlling the delivery of water to said spraying means.

15. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surfaces for the transmission of heat is limited resulting in a substantially uniform degree of temperature rise in the water being heated regardless of the quantity of steam delivered to the confined contact space, a float chamber having communication with said hot water collection space for receiving water therefrom, a float in said chamber, and means actuated by said float for controlling the delivery of water to be heated to said spraying means and for controlling the withdrawal of heated water from said collection space.

16. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surface for the transmission of heat is limited resulting in a substantially uniform degree of temperature rise in the water being heated regardless of the quantity of steam delivered to the confined contact space, a float chamber having communication with said hot water collection space for receiving water therefrom, a float in said chamber, and means actuated by said float for controlling the delivery of water to be heated to said spraying means and for controlling the withdrawal of heated water from said collection space, said float chamber being spaced from said body to allow free circulation of cooling air about the float chamber to prevent flashing of the water therein upon the lowering of the pressure within the float chamber.

17. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surface for the transmission of heat is limited resulting in a substantially uniform degree of temperature rise in the water being heated regardless of the quantity of steam delivered to the confined contact space, a float chamber having communication with said hot water collection space for receiving water therefrom, a float in said chamber, and means actuated by said float for controlling the delivery of water to be heated to said spraying means and for controlling the withdrawal of heated water from said collection space, a conduit for delivering cold water to to said spraying means, said conduit forming part of the walls of said float chamber whereby the cold water flowing through the conduit will cool the water in the float chamber to prevent flashing in the water in the float chamber upon the lowering of the pressure in the float chamber.

18. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surfaces for the transmission of heat is limited resulting in a substantially uniform degree of temperature rise in the water being heated regardless of the quantity of steam delivered to the confined contact space, a float chamber having communication with said hot water collection space for receiving water therefrom, a float in said chamber, and means actuated by said float for controlling the delivery of water to be heated to said spraying means and for controlling the withdrawal of heated water from said collection space, said float chamber being spaced from said body to allow free circulation of air about the float chamber and a conduit for delivering cold water to said spraying means, said conduit forming a part of the walls of said float chamber whereby the cold water flowing through the conduit in cooperation with the circulation of air about the float chamber will cool the water in the float chamber to prevent flashing thereof upon the lowering of the pressure within the float chamber.

19. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surfaces for the transmission of heat is limited resulting in a substantially uniform degree of temperature rise in the water being heated regardless of the quantity of steam delivered to the confined contact space, a float chamber having communication with said hot water collection space for receiving water therefrom, a float in said chamber, and means actuated by said float for controlling the delivery of water to be heated to said spraying means and for controlling the withdrawal of heated water from said collection space, a removable plate carried by said body and having an opening therein communicating with the inlet of said contact space, a plurality of check valves arranged in a single row annularly about said opening, said check valves establishing communication between said steam inlet to said body and said confined space and arranged whereby steam flowing to said confined contact space will not flow across any of the check valves.

20. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surfaces for the transmission of heat is limited resulting in a substantially uniform degree of temperature rise in the water being heated regardless of the quantity of steam delivered to the confined contact space, a float chamber having communication with said hot water collection space for receiving water therefrom, a float in said chamber, and means actuated by said float for controlling the delivery of water to be heated to said spraying means and for controlling the withdrawal of heated water from said collection space, a removable plate carried by said body and having an opening therein communicating with the inlet of said confined contact space, a plurality of check valves carried by said removable plate, said check valves establishing communication between said steam inlet to said body and said confined contact space.

21. In a feedwater heater, a body having a hot water collection space therein and an inlet for steam to the body, means forming a confined steam and water contact space in said body and arranged so that steam passes through the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surfaces for the transmission of heat is limited resulting in a substantially uniform degree of temperature rise in the water being heated regardless of the quantity of steam delivered to the confined contact space, a float chamber having connection with said hot water collection space to receive water therefrom, a float in said chamber, a pump for delivering cold water to said spraying means, and means actuated by said float for controlling the operation of said pump in accordance with the quantity of heated water in said collection space.

22. In a feedwater heater, a body having a hot water collection space therein and an inlet for steam to the body, means forming a confined steam and water contact space in said body and arranged so that steam passes though the contact space from the steam inlet to the collection space, means for spraying water to be heated into said confined contact space inwardly of the steam inlet thereto, and means within said confined contact space for limiting the amount of steam which can pass through the contact space for contact with the water sprayed thereinto whereby the available velocity energy in the steam for breaking up water films in the sprayed water and exposing water surfaces for the transmission of heat is limited resulting in a substantially uniform degree of temperature rise in the water being heated regardless of the quantity of steam delivered to the confined contact space, a float chamber having connection with said hot water collection space to receive water therefrom, a float in said chamber, a pump for delivering cold water to said spraying means, a second pump for withdrawing heated water from said hot water collection space, and means actuated by said float for controlling the operation of said pumps in accordance with the quantity of heated water in said hot water collection space.

23. In a feedwater heater, a body having a hot water collection space, means located inside said body for forming a contact space for steam and water and having communication with said collection space, a dome located above said means, a deck located beneath said dome and spaced therefrom to provide a steam space, said deck being provided with steam passing valves for admitting steam to said steam space, said deck having an opening placing said steam space in communication with said contact space, said dome being of such contour and arrangement as to direct steam through said central opening and into said contact space, means for delivering steam to said valves, a sprayer for water to be heated, said sprayer being of such construction and arrangement as to spray water into said contact space at an angle to the general direction of flow of steam therethrough, means for delivering water to said sprayer, and means for withdrawing heated water from said collection space.

24. In a feedwater heater, a body having a hot water collection space, means located inside said body adjacent its upper limits for forming a contact space for steam and water, said means being in the nature of an open ended duct, a dome located above said means, a deck located beneath said dome and spaced therefrom to provide a steam space, said deck being provided with steam passing valves for admitting steam to said steam space, said deck having an opening placing said steam space in communication with said contact space, said dome being of such contour and arrangement as to direct steam through said central opening and into said contact space, means for delivering steam to said valves, a sprayer for water to be heated, said sprayer being located within said contact space in the general direction of flow of steam therethrough but at an angle thereto, means for delivering water to said sprayer, means for withdrawing heated water from said collection space, said body and said duct having a steam vent, and means located within said contact space and arranged to deliver some of the steam flowing therethrough to said steam vent.

25. In a feedwater heater, a body having a hot water collection space, means located inside said body adjacent its upper limits for forming a contact space for steam and water, said means being in the nature of an open ended duct, a dome located above said means, a deck located beneath said dome and spaced therefrom to provide a steam space, said deck being provided with steam passing valves for admitting steam to said steam space, said deck having an opening placing said steam space in communication with said contact space, said dome being of such contour and arrangement as to direct steam through said central opening and into said contact space, means for delivering steam to said valves, a sprayer for water to be heated, said sprayer being located within said contact space and of such construction as to spray water into said contact space in the general direction of flow of steam therethrough but at an angle thereto, means for delivering water to said sprayer, means for withdrawing heated water from said collection space, said body and said duct having a steam vent, and means located within said contact space and arranged to deliver some of the steam flowing therethrough to said steam vent, said sprayer being located co-axially with and inside said duct and spraying water radially and downwardly with respect to the duct, and said sprayer being adjustable longitudinally of said duct to vary the time interval and flow distance of contact of the steam and water for regulating the degree of heating of the water.

BARTLEY R. McBATH.